US010760442B2

(12) United States Patent
DiFrancesco et al.

(10) Patent No.: US 10,760,442 B2
(45) Date of Patent: Sep. 1, 2020

(54) NON-CONTACT SEAL WITH ANGLED LAND

(71) Applicant: UNITED TECHNOLOGIES CORPORATION, Farmington, CT (US)

(72) Inventors: Michael L DiFrancesco, Waterbury, CT (US); Conway Chuong, Manchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 163 days.

(21) Appl. No.: 15/869,489

(22) Filed: Jan. 12, 2018

(65) Prior Publication Data
US 2019/0218926 A1 Jul. 18, 2019

(51) Int. Cl.
F01D 11/02 (2006.01)
F01D 11/08 (2006.01)
(Continued)

(52) U.S. Cl.
CPC ............ *F01D 11/025* (2013.01); *F01D 11/14* (2013.01); *F01D 11/20* (2013.01); *F04D 29/083* (2013.01);
(Continued)

(58) Field of Classification Search
CPC ...... F01D 11/08; F01D 11/003; F01D 11/025; F01D 5/225; F01D 11/20; F01D 11/22;
(Continued)

(56) References Cited

U.S. PATENT DOCUMENTS 1,651,855 A * 12/1927 Warren .................. F01D 11/02
277/413
2,858,101 A 10/1958 Alford
(Continued)

FOREIGN PATENT DOCUMENTS

EP 1746256 1/2007
EP 3196518 7/2017
(Continued)

OTHER PUBLICATIONS

European Patent Offce, European Search Report dated May 29, 2019 in Application No. 18205343.9.

*Primary Examiner* — Eldon T Brockman
*Assistant Examiner* — Wesley Le Fisher
(74) *Attorney, Agent, or Firm* — Snell & Wilmer, L.L.P.

(57) ABSTRACT

An apparatus for sealing a circumferential gap between a stationary component and a rotating member is disclosed. The rotating member is configured to rotate about a longitudinal axis and has a radially outer surface disposed at a first non-zero angle with respect to the longitudinal axis. The apparatus includes a stator disposed circumferentially about the longitudinal axis and a shoe configured for translation in a radial direction with respect to the stator. The shoe includes a circumferential surface and a plurality of protrusions extending radially inward from the circumferential surface toward the rotating member, each one of the plurality of protrusions having a length configured to maintain a clearance gap with respect to the rotating member.

12 Claims, 4 Drawing Sheets

(51) Int. Cl.
*F01D 11/14* (2006.01)
*F01D 11/20* (2006.01)
*F16J 15/44* (2006.01)
*F04D 29/08* (2006.01)

(52) U.S. Cl.
CPC ......... *F16J 15/442* (2013.01); *F05D 2220/32* (2013.01); *F05D 2240/55* (2013.01); *F05D 2250/314* (2013.01); *F05D 2260/38* (2013.01)

(58) Field of Classification Search
CPC .......... F01D 11/14; F01D 11/16; F01D 11/18; F05D 2250/314; F05D 2240/55
See application file for complete search history.

(56) References Cited

U.S. PATENT DOCUMENTS

| | | | | |
|---|---|---|---|---|
| 5,029,875 | A * | 7/1991 | Spain | F01D 11/00 277/307 |
| 5,509,780 | A * | 4/1996 | Synfelt | F01D 11/025 277/413 |
| 5,632,598 | A * | 5/1997 | Maier | F01D 5/225 415/173.5 |
| 7,775,763 | B1 * | 8/2010 | Johnson | F04D 29/167 415/111 |
| 8,413,992 | B2 | 4/2013 | Uehara et al. | |
| 9,057,383 | B2 * | 6/2015 | Vannini | F04D 29/122 |
| 9,074,486 | B2 * | 7/2015 | Deo | F01D 11/003 |
| 9,416,674 | B1 * | 8/2016 | Ebert | F16J 15/342 |
| 10,316,679 | B2 * | 6/2019 | Nishikawa | F01D 9/02 |
| 2005/0116425 | A1 * | 6/2005 | Blatchford | F01D 11/02 277/412 |
| 2008/0175706 | A1 * | 7/2008 | Ikeda | F01D 5/3046 415/173.4 |
| 2008/0265513 | A1 * | 10/2008 | Justak | F01D 11/025 277/301 |
| 2011/0309585 | A1 * | 12/2011 | Uehara | F01D 11/02 277/352 |
| 2012/0043728 | A1 * | 2/2012 | Zeng | F01D 11/001 277/412 |
| 2012/0288360 | A1 * | 11/2012 | Kuwamura | F01D 5/225 415/173.1 |
| 2013/0259660 | A1 * | 10/2013 | Dale | F16J 15/445 415/170.1 |
| 2014/0314579 | A1 * | 10/2014 | Kuwamura | F01D 11/001 416/223 R |
| 2016/0130963 | A1 * | 5/2016 | Wilson | F01D 11/001 60/805 |
| 2016/0130965 | A1 * | 5/2016 | Yamaguchi | F01D 1/04 415/13 |
| 2016/0376904 | A1 * | 12/2016 | Schwarz | F01D 11/02 415/230 |
| 2018/0347704 | A1 * | 12/2018 | Rippel | F16J 15/4472 |
| 2019/0093500 | A1 * | 3/2019 | Song | F01D 11/16 |

FOREIGN PATENT DOCUMENTS

| | | |
|---|---|---|
| GB | 668434 | 3/1952 |
| WO | 2009074355 | 6/2009 |

* cited by examiner

NON-CONTACT SEAL WITH ANGLED LAND

GOVERNMENT LICENSE RIGHTS

This disclosure was made with government support under contract FA8650-09-D-2923-0021, awarded by the United Stated Air Force. The government has certain rights in the disclosure.

FIELD

The present disclosure relates to gas turbine engines and, more particularly, to non-contact seal assemblies used in gas turbine engines.

BACKGROUND

Gas turbine engines typically include a compressor section, a combustor section and a turbine section. During operation, air is pressurized in the compressor section and mixed with fuel and burned in the combustor section to generate hot combustion gases. The hot combustion gases are communicated through the turbine section, which extracts energy from the hot combustion gases to power the compressor section and other loads occurring within a gas turbine engine. The compressor and turbine sections typically experience regions of high pressure between stationary and rotating componentry, and seals may work to prevent or minimize leakage between the componentry.

SUMMARY

An apparatus for sealing a circumferential gap between a stationary component and a rotating member is disclosed. The rotating member is configured to rotate about a longitudinal axis and have a radially outer surface disposed at a first non-zero angle with respect to the longitudinal axis. The apparatus includes a stator disposed circumferentially about the longitudinal axis and a shoe configured for translation in a radial direction with respect to the stator. The shoe includes a circumferential surface and a plurality of protrusions extending radially inward from the circumferential surface toward the rotating member. Each of the plurality of protrusions has a length configured to maintain a gap with respect to the rotating member.

In various embodiments, the shoe is connected to the stator by a beam having a first end connected to the stator and a second end connected to the shoe. In various embodiments, the circumferential surface is oriented substantially parallel to the longitudinal axis. In various embodiments, each of the plurality of protrusions includes a tip portion spaced a gap from the radially outer surface of the rotating member. In various embodiments, each one of the plurality of protrusions includes a tip portion spaced a constant gap from the radially outer surface of the rotating member. In various embodiments, at least one of the plurality of protrusions includes a tip portion disposed at a non-zero tip angle with respect to the longitudinal axis. In various embodiments, the non-zero tip angle is equal to the first non-zero angle. In various embodiments, the circumferential surface is oriented at a second non-zero angle with respect to the longitudinal axis. In various embodiments, the first non-zero angle is equal to the second non-zero angle.

A gas turbine engine is disclosed. In various embodiments, the gas turbine engine includes a compressor section configured to rotate about a longitudinal axis. The compressor section includes a rotating member having a radially outer surface disposed at a first non-zero angle with respect to the longitudinal axis. A stator is disposed circumferentially about the longitudinal axis. The gas turbine engine also includes a shoe configured for translation in a radial direction with respect to the stator. The shoe includes a circumferential surface and a plurality of protrusions extending radially inward from the circumferential surface toward the radially outer surface of the rotating member. In various embodiments, each of the plurality of protrusions is configured to maintain a non-contact clearance with respect to the radially outer surface of the rotating member.

In various embodiments, the shoe is connected to the stator by a first beam and a second beam, each having a first end connected to the stator and a second end connected to the shoe. In various embodiments, the circumferential surface is oriented substantially parallel to the longitudinal axis. In various embodiments, the first non-zero angle is greater than about one degree. In various embodiments, the first non-zero angle is within a range from about one degree to about five degrees. In various embodiments, each of the plurality of protrusions includes a tip portion spaced a constant clearance gap from the radially outer surface of the rotating member. In various embodiments, the rotating member is a spool. In various embodiments, at least one of the plurality of protrusions includes a tip portion disposed at a non-zero tip angle with respect to the longitudinal axis. In various embodiments, the circumferential surface is oriented at a second non-zero angle with respect to the longitudinal axis. In various embodiments, the first non-zero angle is equal to the second non-zero angle.

A gas turbine engine is disclosed. In various embodiments, the gas turbine engine includes a rotating member configured to rotate about a longitudinal axis, the rotating member having a radially outer surface disposed at a first non-zero angle with respect to the longitudinal axis. A stator is disposed circumferentially about the longitudinal axis. A shoe is configured for translation in a radial direction with respect to the stator. In various embodiments, the shoe includes a circumferential surface and a plurality of protrusions extending radially inward from the circumferential surface toward the radially outer surface of the rotating member, each one of the plurality of protrusions configured to maintain a non-contact clearance with respect to the radially outer surface of the rotating member. In various embodiments, the shoe is connected to the stator by a first beam and a second beam, each having a first end connected to the stator and a second end connected to the shoe. In various embodiments, the circumferential surface is oriented substantially parallel to the longitudinal axis. In various embodiments, the first non-zero angle is within a range from about one degree to about five degrees.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
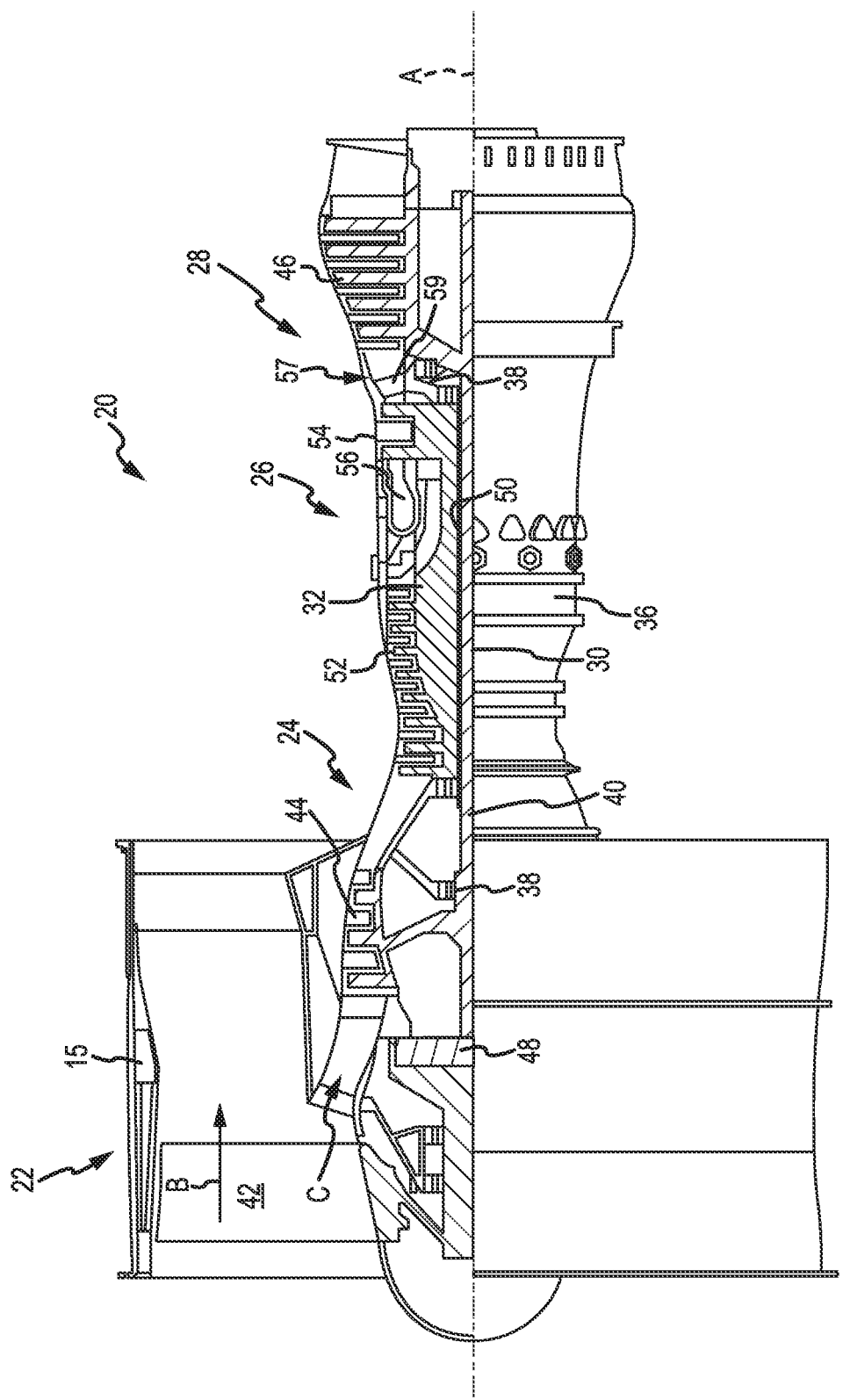
FIG. 1 is a schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of the bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a geared architecture 48 to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via the bearing systems 38 about the engine central longitudinal axis A, which is collinear with their longitudinal axes.

The air in the core flow path is compressed by the low pressure compressor 44 and then the high pressure compressor 52, mixed and burned with fuel in the combustor 56, and then expanded over the high pressure turbine 54 and low pressure turbine 46. The mid-turbine frame 57 includes airfoils 59 that are in the core flow path C. The low pressure turbine 46 and the high pressure turbine 54 rotationally drive the respective low speed spool 30 and the high speed spool 32 in response to the expansion. It will be appreciated that each of the positions of the fan section 22, compressor section 24, combustor section 26, turbine section 28, and fan drive gear system 48 may be varied. For example, the gear system 48 may be located aft of the combustor section 26 or even aft of the turbine section 28, and the fan section 22 may be positioned forward or aft of the location of the gear system 48.

Figure 2:
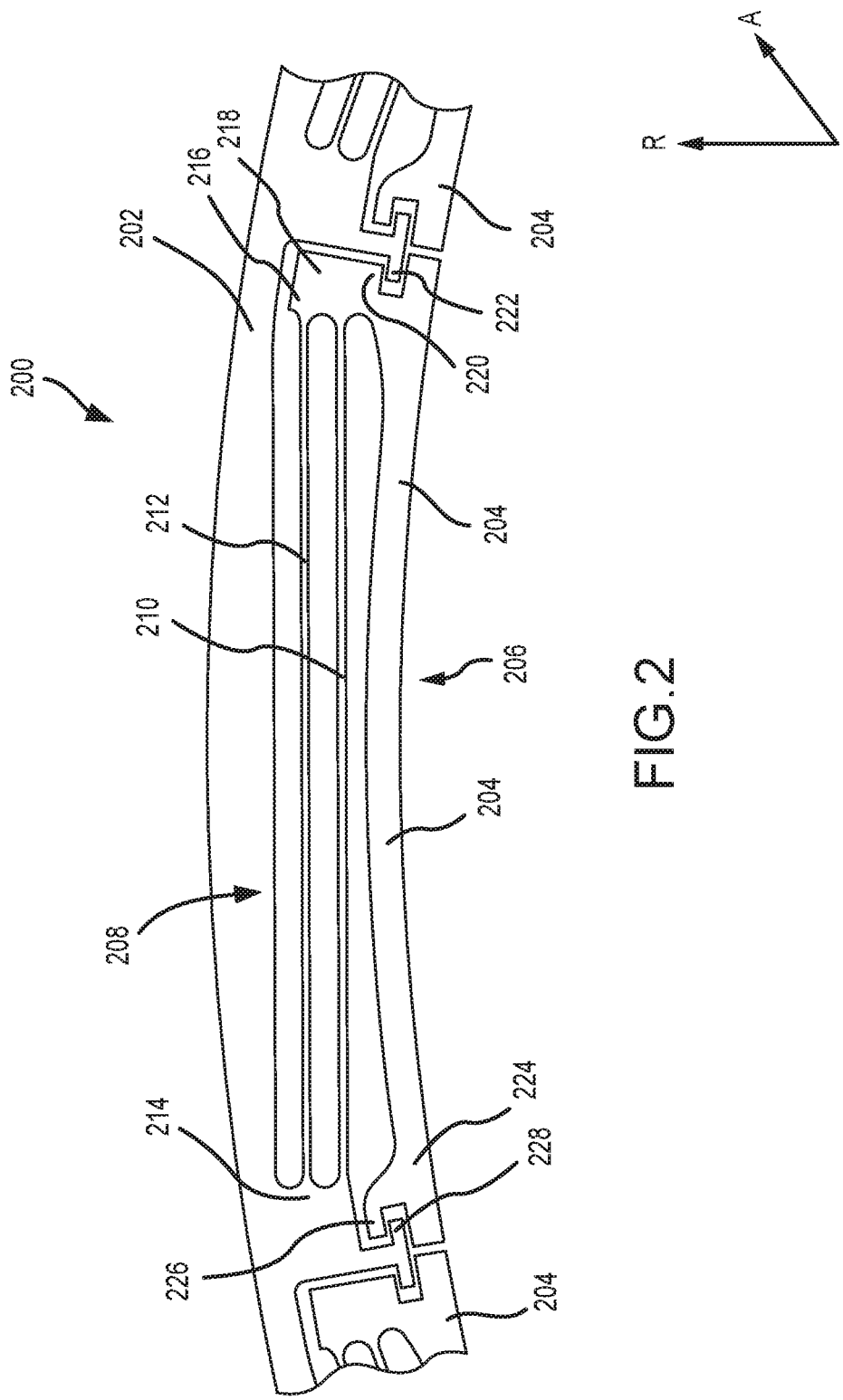
FIG. 2 is a schematic view of a seal in accordance with various embodiments.

Referring now to FIG. 2, a seal 200 is illustrated according to various embodiments. The seal 200 may be incorporated into one or more sections of a gas turbine engine, such as, for example, the fan section 22, the compressor section 24 or the turbine section 28 described above with reference to the gas turbine engine 20 illustrated in FIG. 1. In various embodiments, the seal 200 may include at least some of the characteristics that are common among hydrostatic advanced low leakage seals (or HALO™ seals), available from Advanced Technologies Group, Inc. of Stuart, Fla. Such characteristics may include the provisioning of one or more floating, non-contact seals. In various embodiments, the seal 200 includes a stator portion 202 configured for coupling to fixed or stationary hardware relative to a rotating member, such as, for example, a rotor or shaft or land or spool. The stator portion 202 generally includes one or more shoes 204 that are circumferentially spaced in a non-contact position about the exterior of the rotating member. The shoes 204 are formed to have a sealing surface 206 proximate the exterior surface of the rotating member.

Each of the shoes 204 typically includes a number of spring elements 208. The spring elements 208 each include an inner beam 210 and an outer beam 212, with the outer beam 212 spaced radially outward of the inner beam 210. A first end 214 of each one of the inner beam 210 and the outer beam 212 is mounted to or integrally formed with the stator portion 202 and a second end 216 is mounted to or formed integrally with a first stop 218. The first stop 218 is connected to or integrally formed with one of the shoes 204, and has a first arm 220 configured to stop or abut against a first shoulder 222 when radial travel of the shoes 204 has reached a pre-determined maximum distance in the inward and outward directions. Similarly, a second stop 224 is connected to or integrally formed with the shoes 204. The second stop 224 is circumferentially spaced from the first stop 218 and positioned proximate the location at which the inner beam 210 and the outer beam 212 connect to the stator portion 202. The second stop 224 has a second arm 226 configured to stop or abut against a second shoulder 228 when radial travel of the shoes 204 has reached a pre-determined maximum distance in the inward and outward directions.

Figure 3:
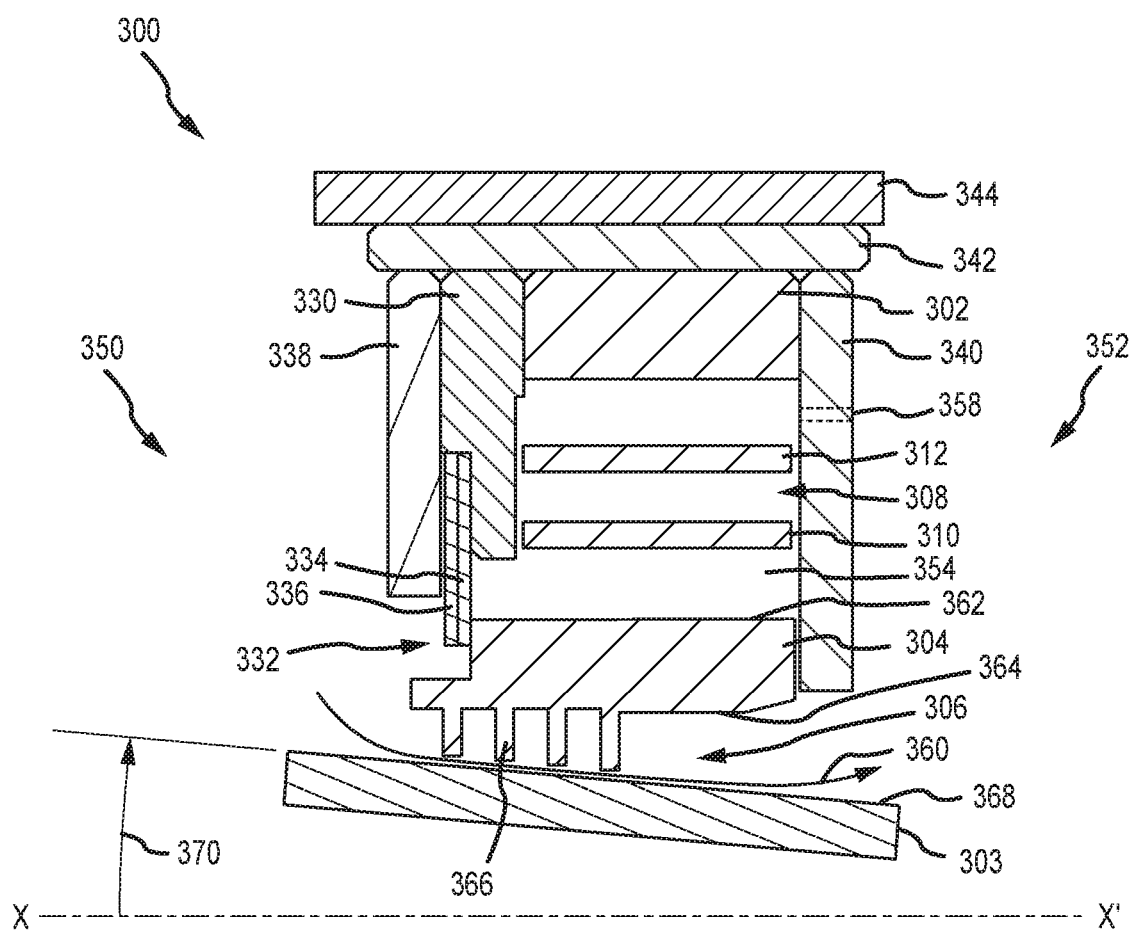
FIG. 3 is a schematic view of a seal in accordance with various embodiments.

Referring now to FIG. 3, a cross sectional schematic view of a seal 300, similar to the seal 200 described above with reference to FIG. 2, is illustrated according to various embodiments. The seal 300 may include a stator portion 302 configured for coupling to fixed or stationary hardware relative to a rotating member 303 such as, for example, a rotor or shaft or land or spool. The rotating member 303 may be mounted for rotation about a longitudinal axis X-X', such as the engine central longitudinal axis A referred to in FIG. 1. In various embodiments, the rotating member 303 may comprise a low speed spool or a high speed spool, such as the low speed spool 30 or the high speed spool 32 described above with reference to FIG. 1. The stator portion 302 generally includes one or more shoes 304 that are circumferentially spaced in a non-contact position about the exterior of the rotating member 303. The shoes 304 are formed to have sealing structure 306 proximate the exterior surface of the rotating member 303. In various embodiments, the sealing structure 306 may include one or more protrusions 366, such as knife edges. Each of the shoes 304 typically includes a number of spring elements 308. In various embodiments, the spring elements 308, similar to leaf springs, each include an inner beam 310 and an outer beam 312, with the outer beam 312 spaced radially outward of the inner beam 310. In accordance with various embodiments, the seal 300 may include a spacer 330, a secondary seal 332, which may include a first secondary seal 334 and a second secondary seal 336, a secondary seal cover 338, a seal plate 340 and a carrier 342. In various embodiments, the seal 300 is positioned within or connected to a static structure 344, which may circumferentially surround the seal 300. In various embodiments, the seal 300 may comprise a non-contact seal, configured to not contact the rotating member 303 or, in other words, to maintain a small gap.

With continued reference to FIG. 3, a fluid, such as air, for example, may be present at a high pressure side 350 of the seal 300 and at a low pressure side 352 of the seal 300. In various embodiments, the fluid may traverse the seal 300 in the axial direction from the high pressure side 350 to the low pressure side 352 via a flow path 360 between the shoe 304 and the rotating member 303. On the high pressure side 350, the secondary seal 332 restricts high-pressure fluid from entering a gap 354 within the seal 300 and exerting a downward force on the shoe 304 via the high-pressure fluid. The gap 354 exists between and about the components comprising the carrier 342, the outer beam 312, the inner beam 310 and the shoe 304, with the shoe 304 configured to translate radially in response to a fluid pressure against an interior surface 362 of the shoe 304 or, more particularly, in response to a pressure difference between the pressure residing at the interior surface 362 and the pressure residing at an exterior surface 364 of the shoe 304. Conversely, on the low pressure side 352, the seal plate 340 may comprise a plurality of apertures 358 that allow low-pressure fluid from the low pressure side 352 of the seal 300 to flow into the gap 354 and exert a downward force on the shoe 304 via the low pressure fluid on the interior surface 362. In various embodiments, the exterior surface 364 of the shoe 304 is a circumferential surface disposed annularly about the longitudinal axis X-X'.

As described above, the seal 300 may comprise the shoe 304 attached to the stator portion 302 via the inner beam 310 and the outer beam 312. The inner beam 310 and the outer beam 312 provide a spring force that resists movement of the shoe 304 in the radial direction, both toward and away from the stator portion 302 and the rotating member 303. The resistive nature of the spring force works in series with a pressure difference in the radial direction across the shoe 304, allowing the shoe 304 to translate in radially inward and outward directions in response to fluctuations in operating pressures—e.g., the pressures at the high pressure side 350 and the low pressure side 352—and in the radial position of the rotating member, which can fluctuate in response to heat and angular momentum.

Still referring to FIG. 3, in various embodiments, a radially outer surface 368 of the rotating member 303 is disposed at a non-zero angle 370 with respect to the longitudinal axis X-X'. In various embodiments, a non-zero angle 370 with respect to the longitudinal axis X-X' results from internal stresses occurring within the rotating member 303 during operation and due, for example, to thermal loads or angular momentum. In various embodiments, the non-zero angle 370 may arise during operation due to thermal loads or angular momentum, while during non-operation, the rotating member 303 is substantially cylindrical, meaning an angle between the longitudinal axis X-X' and the radially outer surface 368 is substantially zero (or lines defining the axis and the surface are parallel and separated by a substantially constant radial distance). In various embodiments, the shoe 304 and sealing structure 306, which may include the one or more protrusions 366, are configured to operably engage with and provide a seal about the rotating member 303, where the member is configured to deform from a substantially cylindrical shaped member during non-operation to a conical shaped member having a non-zero angle 370 with respect to the longitudinal axis X-X' during operation. In various embodiments, design of the rotating member 303 contemplates the radially outer surface 368 of the rotating member 303 have a non-zero angle 370 with respect to the longitudinal axis X-X' during both non-operation and operation. In various embodiments, design of the rotating member 303 contemplates the radially outer surface 368 of the rotating member 303, including substantial portions of the interior of the rotating member 303, have a non-zero angle 370 with respect to the longitudinal axis X-X'. In various embodiments, substantial achievements in reducing deflection of the radially outer surface 368 of the rotating member 303 during operation are realized where design of the rotating member 303 contemplates the radially outer surface 368 of the rotating member 303 having a non-zero angle 370 with respect to the longitudinal axis X-X'. In other words, in various embodiments, providing a non-zero angle 370 to the radially outer surface 368 of the land or rotating member 303 during non-operation provides increased stiffness to the land or rotating member 303 due to the component having a conical shape as opposed to cylindrical shape and, as such, reduces deflection of the land or rotating member 303 during operation due to thermal loads and angular momentum. The reduced deflection of the land or rotating member 303 leads to reduced travel demand of the shoe 304 in the radially inward and outward directions in response to such deflection.

Figure 4A:
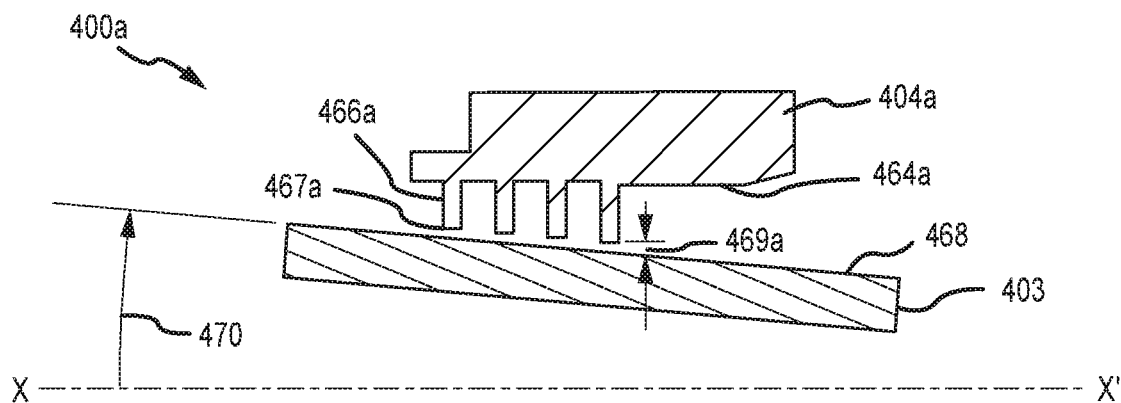
FIGS. 4A, 4B and 4C are schematic view of shoes positioned adjacent rotating members in accordance with various embodiments.
Figure 4B:
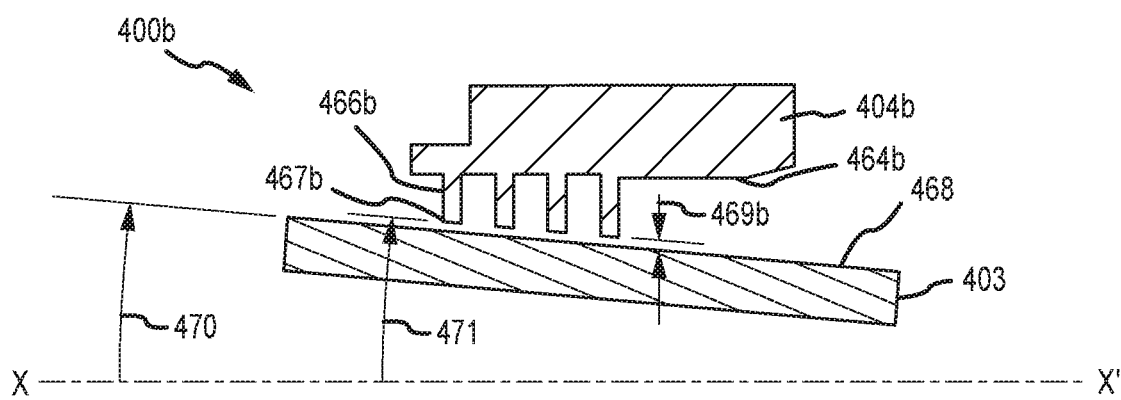
Figure 4C:
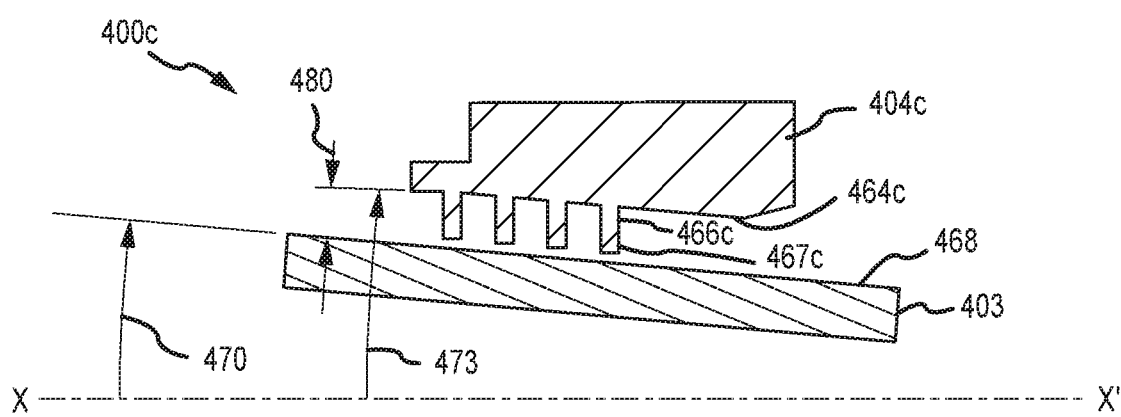

Referring now to FIGS. 4A, 4B and 4C, various embodiments of a seal having a shoe are illustrated where the shoe is in non-contact relation with a rotating member 403 (e.g., a rotor or shaft or land or spool) that includes a radially outer surface 468 disposed at a non-zero angle 470 with respect to a longitudinal axis X-X'. Referring to FIG. 4A, for example, a seal 400a is illustrated having a shoe 404a positioned adjacent the rotating member 403 including the radially outer surface 468 disposed at a non-zero angle 470 with respect to a longitudinal axis X-X'. The shoe 404a includes one or more protrusions 466a extending radially inward from an exterior surface 464a of the shoe 404a. Each of the protrusions 466a has a tip portion 467a disposed adjacent the radially outer surface 468 of the rotating member 403. In various embodiments, the protrusions 466a may be configured to maintain a clearance gap 469a, within a threshold amount, between the tip portion 467a of each of the protrusions 466a and the radially outer surface 468 of the rotating member 403. Maintaining a clearance gap 469a that is the same or constant among the various tip portions 467a and the radially outer surface 468 disposed at a non-zero angle 470 provides a more consistent seal across the axial direction of the shoe 404a. According to various embodiments, the non-contact relation contemplates a clearance gap 469a within a range from about 0.005 inches (0.127 mm) to about 0.020 inches (0.508 mm). According to various embodiments, the clearance gap 469a is about 0.010 inches (0.254 mm). In various embodiments, each of the tip portions 467a of the one or more protrusions 466a exhibits a clearance gap 469a having a constant value. In various embodiments, the exterior surface 464a of the shoe 404a defines a surface that is substantially parallel with the longitudinal axis X-X'. In various embodiments, the radially outer surface 468 is disposed at a non-zero angle 470 with respect to a longitudinal axis X-X', within a range from about one degree to about five degrees.

Referring now to FIG. 4B, a seal 400b is illustrated having a shoe 404b positioned adjacent the rotating member 403 including the radially outer surface 468 disposed at a non-zero angle 470 with respect to a longitudinal axis X-X'. The shoe 404a is similar to the shoe 404a described above with reference to FIG. 4A, except the shoe 404b includes one or more protrusions 466b having a tip portion 467b disposed at a tip angle 471 with respect to the longitudinal axis X-X' that is substantially equal to the non-zero angle 470 between the radially outer surface 468 of the rotating member 403 and the longitudinal axis X-X'. In various embodiments, the tip angle 471 is equal to the non-zero angle 470. In various embodiments, the protrusions 466b may be configured to maintain a clearance gap 469b, within a threshold amount, between the tip portion 467b of each of the protrusions 466b and the radially outer surface 468 of the rotating member 403. According to various embodiments, the non-contact relation contemplates a clearance gap 469b within a range from about 0.005 inches (0.127 mm) to about 0.020 inches (0.508 mm). According to various embodiments, the clearance gap 469b is about 0.010 inches (0.254 mm). In various embodiments, each of the tip portions 467b of the one or more protrusions 466b exhibits a clearance gap 469b having the same value. In various embodiments, an exterior surface 464b of the shoe 404b defines a surface that is substantially parallel with the longitudinal axis X-X'. In various embodiments, the radially outer surface 468 is disposed at the non-zero angle 470 with respect to a longitudinal axis X-X', within a range from about one degree to about five degrees.

Referring now to FIG. 4C, a seal 400c is illustrated having a shoe 404c positioned adjacent the rotating member 403 including the radially outer surface 468 disposed at a non-zero angle 470 with respect to a longitudinal axis X-X'. The shoe 404c is similar to the shoe 404a and the shoe 404b described above with reference to FIGS. 4A and 4B, respectively, except the shoe 404c includes an exterior surface 464c that is disposed at an angle 473 with respect to the longitudinal axis X-X' that is substantially equal to the non-zero angle 470 between the radially outer surface 468 of the rotating member 403 and the longitudinal axis X-X'. In various embodiments, the angle 473 is equal to the non-zero angle 470. In various embodiments, the shoe 404c includes one or more protrusions 466c having a tip portion 467c that shares one or more of the characteristics described above with reference to FIGS. 4A and 4B, including the clearance gap values with respect to the radially outer surface 468 of the rotating member 403. In various embodiments, each of the protrusions 466c has a length 480 that is substantially constant.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus for sealing a circumferential gap between a stationary component and a rotating member configured to rotate about a longitudinal axis, comprising:
    a stator disposed circumferentially about the longitudinal axis; and
    a shoe configured for translation in a radial direction with respect to the stator,
        wherein the shoe includes a circumferential surface and a plurality of protrusions extending radially inward from the circumferential surface toward the rotating member, the rotating member having a radially outer surface disposed at a non-zero angle with respect to the longitudinal axis, each one of the plurality of protrusions having a length configured to maintain a constant clearance gap with respect to the rotating member and a tip portion spaced a radial distance equal to the constant clearance gap from the radially outer surface of the rotating member,
        wherein the shoe is connected to the stator by a first beam and a second beam, each having a first end connected to the stator and a second end connected to the shoe and
        wherein the circumferential surface is oriented parallel to the longitudinal axis.

2. The apparatus of claim 1, wherein the shoe is configured to translate in a direction perpendicular to the longitudinal axis.

3. The apparatus of claim 2, wherein the radial distance is 0.005 inches.

4. The apparatus of claim 2, wherein at least one of the plurality of protrusions includes a tip portion disposed at a non-zero tip angle with respect to the longitudinal axis.

5. The apparatus of claim 4, wherein the non-zero tip angle is equal to the non-zero angle.

6. A gas turbine engine, comprising:
    a compressor section configured to rotate about a longitudinal axis, the compressor section including a rotating member having a radially outer surface disposed at a non-zero angle with respect to the longitudinal axis;
    a stator disposed circumferentially about the longitudinal axis; and
    a shoe configured for translation in a radial direction with respect to the stator,
        wherein the shoe includes a circumferential surface and a plurality of protrusions extending radially inward from the circumferential surface toward the radially outer surface of the rotating member, each one of the plurality of protrusions configured to maintain a constant clearance gap with respect to the radially outer surface of the rotating member and a tip portion spaced a radial distance equal to the constant clearance gap from the radially outer surface of the rotating member,
        wherein the shoe is connected to the stator by a first beam and a second beam, each having a first end connected to the stator and a second end connected to the shoe and
        wherein the circumferential surface is oriented parallel to the longitudinal axis.

7. The gas turbine engine of claim 6, wherein the non-zero angle is greater than one degree.

8. The gas turbine engine of claim 6, wherein the non-zero angle is within a range from one degree to five degrees.

9. The gas turbine engine of claim 7, wherein the rotating member is a spool.

10. The gas turbine engine of claim 7, wherein at least one of the plurality of protrusions includes a tip portion disposed at a non-zero tip angle with respect to the longitudinal axis.

11. The gas turbine engine of claim 10, wherein the non-zero tip angle is equal to the non-zero angle.

12. A gas turbine engine, comprising:
    a rotating member configured to rotate about a longitudinal axis, the rotating member having a radially outer surface disposed at a non-zero angle with respect to the longitudinal axis;
    a stator disposed circumferentially about the longitudinal axis; and
    a shoe configured for translation in a radial direction with respect to the stator,
        wherein the shoe includes a circumferential surface and a plurality of protrusions extending radially inward from the circumferential surface toward the radially outer surface of the rotating member, each one of the plurality of protrusions configured to maintain a constant clearance gap with respect to the radially outer surface of the rotating member and a tip portion spaced a radial distance equal to the constant clearance gap from the radially outer surface of the rotating member,
        wherein the shoe is connected to the stator by a first beam and a second beam, each having a first end connected to the stator and a second end connected to the shoe,
        wherein the circumferential surface is oriented parallel to the longitudinal axis and
        wherein the non-zero angle is within a range from one degree to five degrees.

* * * * *